US012450379B2

(12) United States Patent
Sahani et al.

(10) Patent No.: US 12,450,379 B2
(45) Date of Patent: Oct. 21, 2025

(54) INTELLIGENT DEVICE WIPES FOR MOBILE DEVICE MANAGEMENT

(71) Applicant: Omnissa, LLC, Mountain View, CA (US)

(72) Inventors: Hemant Sahani, Fremont, CA (US); Dinesh Upreti, Delhi (IN); Kannan Parthasarathy, Palo Alto, CA (US); Subrahmanya Kumar Giliyaru, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 162 days.

(21) Appl. No.: 18/135,205

(22) Filed: Apr. 17, 2023

(65) Prior Publication Data

US 2024/0249009 A1    Jul. 25, 2024

(30) Foreign Application Priority Data

Jan. 20, 2023  (IN) .............................. 202341004109

(51) Int. Cl.
*G06F 21/62* (2013.01)
(52) U.S. Cl.
CPC .. *G06F 21/6218* (2013.01); *G06F 2221/2143* (2013.01)
(58) Field of Classification Search
CPC ........ G06F 21/6216; G06F 2221/2143; H04W 12/126; H04W 12/60; H04W 12/37
See application file for complete search history.

(56) References Cited

U.S. PATENT DOCUMENTS

| | | | |
|---|---|---|---|
| 7,584,201 B2* | 9/2009 | Casey | G06F 21/88 |
| 8,495,700 B2 | 7/2013 | Shahbazi | |
| 10,165,447 B2 | 12/2018 | Raleigh et al. | |
| 11,418,543 B2 | 8/2022 | Xuan | |
| 2013/0007245 A1* | 1/2013 | Malik | H04W 12/37 |
| | | | 709/223 |
| 2016/0094560 A1 | 3/2016 | Stuntebeck | |
| 2020/0053090 A1 | 2/2020 | Kliger et al. | |

OTHER PUBLICATIONS

International Search Report and Written Opinion mailed Mar. 1, 2024 in International Application No. PCT/IB2024/050516, 17 pages.

* cited by examiner

*Primary Examiner* — Paul E Callahan
(74) *Attorney, Agent, or Firm* — Kim & Stewart LLP

(57) ABSTRACT

Disclosed are various embodiments for determining whether to initiate a remote device wipe in a mobile device management context. In one example, a system comprises a computing device configured to identify a device wipe condition for a client device and determine a wipe policy associated with the device wipe condition. A time for a time delay is initiated for a device wipe action of the client device. A wipe instruction is transmitted to execute the device wipe action based on an expiration of the time delay for the device wipe action.

17 Claims, 6 Drawing Sheets

| Wipe Approval | Priority Group | Device ID. | Wipe Policy | Assignment | Remaining Time Until Device Wipe |
|---|---|---|---|---|---|
| ◐ ○ | Y | AB3 | Priority Device | Executive | Admin Approval Required |
| ◐ ○ | Y | XXXXX | Priority Device | Executive | Admin Approval Required |
| ◐ ○ | N | XXXXX | Conditional | Marketing | 12/7/2025 13:00:00 |
| ◐ ○ | N | XXXXX | Conditional | Marketing | 12/7/2025 13:00:00 |
| ◐ ○ | N | XXXXX | Conditional | Engineering | 12/7/2025 13:00:00 |
| ◐ ○ | N | XXXXX | Critical | Engineering | Immediately Executed on 12/6/2024 |
| 303 | 309 | 312 | 315 | 318 | 321 |

FIG. 3

INTELLIGENT DEVICE WIPES FOR MOBILE DEVICE MANAGEMENT

RELATED APPLICATION

Benefit is claimed under 35 U.S.C. 119(a)-(d) to Foreign Application Serial No. 202341004109 filed in India entitled "INTELLIGENT DEVICE WIPES FOR MOBILE DEVICE MANAGEMENT", on Jan. 20, 2023 by VMware, Inc., which is herein incorporated in its entirety by reference for all purposes.

BACKGROUND

Enterprises use mobile device management systems to manage the end-to-end lifecycle of their devices. One aspect of mobile device management involves remotely wiping a mobile device based on various reasons. The remote wiping of a mobile device is performed in order to prevent or mitigate unauthorized access to the mobile device and/or restricted resources that are accessible by way of the mobile device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is an example administrative user interface according to various embodiments of the present disclosure.

DETAILED DESCRIPTION

Figure 1:
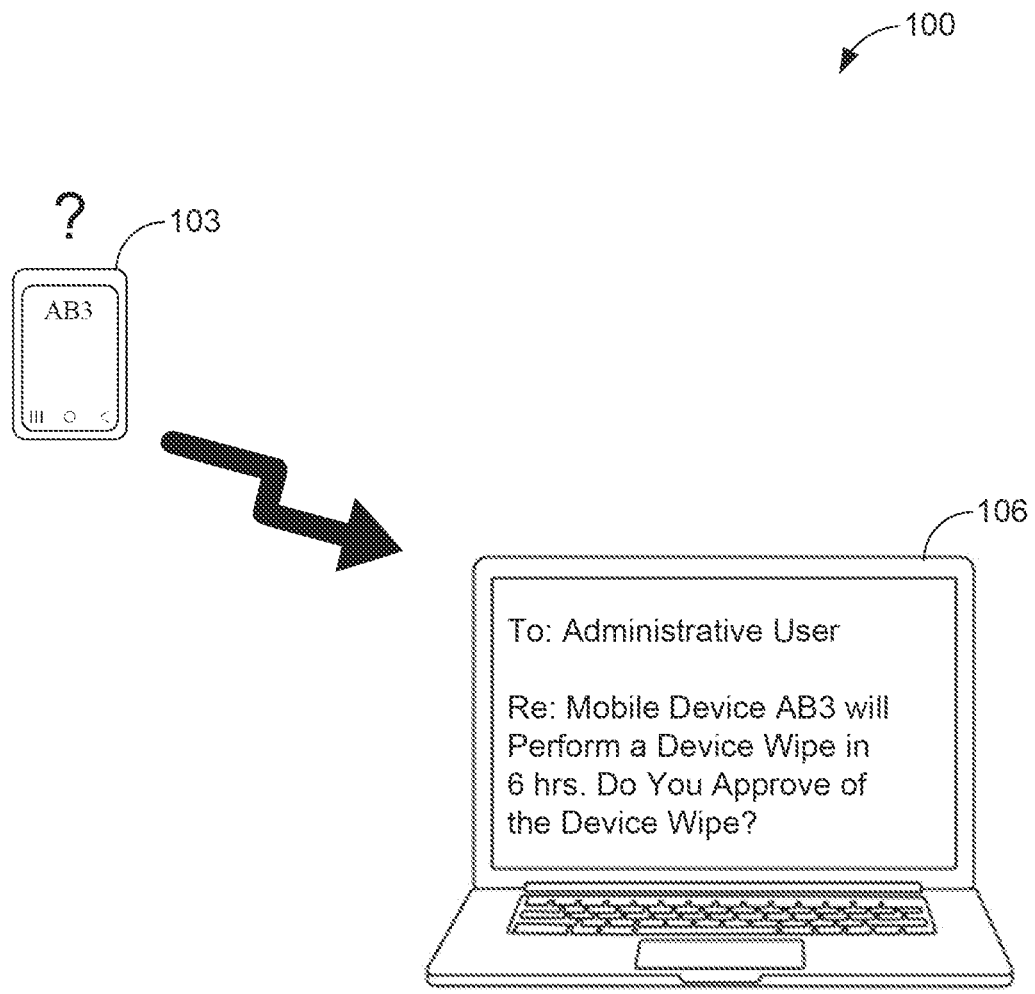
FIG. 1 is a pictorial diagram of a mobile device wipe scenario according to various embodiments of the present disclosure.

The embodiments of the present disclosure relate to determining whether to initiate a remote device wipe in a mobile device management context. Enterprises can use mobile device management systems to manage the end-to-end lifecycles of their devices. One aspect of the mobile device management system can be to remotely wipe the memory of a mobile device managed by the system based on one or more specified conditions. In some cases, compliance policies can wipe the memory of a device unintentionally leading to revenue and productivity loss for the enterprise. For example, an organization can have a compliance policy to remote wipe devices that fail to check-in with the management system within a ninety-day time window. A mobile device that is being used in a compliant manner, but the mobile device fails to check-in to the management service can result in an unintentional device wipe. For instance, the mobile device may have been prevented from checking in with the management service because of incompatible software or other suitable scenarios.

The various embodiments of the present disclosure are related to determining whether to initiate a remote device wipe based on a particular context associated with the mobile device (e.g., evaluating various conditions). In some instances, the embodiments can immediately perform a remote device wipe on the mobile device based on the detection of certain critical conditions, such as a compromised device (e.g., jailbreak/root detection or removing certain default software restrictions), a passcode incompliance condition, an encryption incompliance condition, and other suitable critical conditions. In other detected conditions, the embodiments can provide a time delay for further analysis of the detected conditions that triggered a potential device wipe. For example, the embodiments can notify an administrative user that one or more managed devices of the organization have triggered a potential device wipe action. The administrative user may have an eight-hour time window to approve or reject the potential device wipe action. If a decision is not received (e.g., either an approval or a rejection) by the end of the time period, then the embodiments can proceed with the remote device wipe action. In some embodiments, during the time delay, the embodiments can instruct the one or more mobile devices to perform certain remedial actions to prevent or mitigate unauthorized access to the mobile devices. Some non-limiting examples of remedial actions can include remotely locking the mobile devices, restricting functionality of the mobile device (e.g., disabling access to the camera, microphone, wireless communication ports), restricting access to files (e.g., disabling viewing, copying, printing, modifying), and other suitable aspects of the mobile device.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

As illustrated in FIG. 1, shown is a pictorial diagram of a device wipe scenario 100 of a mobile device 103 that is managed by an organization. In this non-limiting example, the mobile device 103 has an agent application associated with the organization installed. The agent application can be used by the organization to manage the operations of the mobile device 103. The agent application can transmit data to a management service. The administrator can access data associated with the mobile device 103 using an administrative device 106, which is associated with the management service. For example, the transmitted data can include detected wipe conditions, installed software components, hardware components, and other suitable data related to the operation of the mobile device 103.

As a first example, the agent application of the mobile device 103 may have failed to check-in with the management service or failed to provide a status update to the management service within the last ninety days. The management service can display an administrative interface on the administrative device 106. The administrative interface can indicate that a particular mobile device 103 (e.g., with device identifier "AB3") has triggered a wipe condition because of a failure to check-in with the management service within the last ninety days. A six-hour timer for a device wipe instruction has been started. After the expiration of the timer, the agent application installed in the mobile device 103 can receive a device wipe instruction from the management service or the mobile device 103 can perform the device wipe without additional instruction from the management service.

The administrative interface includes an identifier (e.g., "AB3") for the mobile device 103, a time window (e.g., six hours) before the device wipe will occur, a wipe workflow element for approving or rejecting the device wipe by an administrative user, and other suitable data relating to the device wipe scenario. The other data can be used for the administrative user to investigate the cause of the mobile device 103's failure to check-in.

Figure 2:
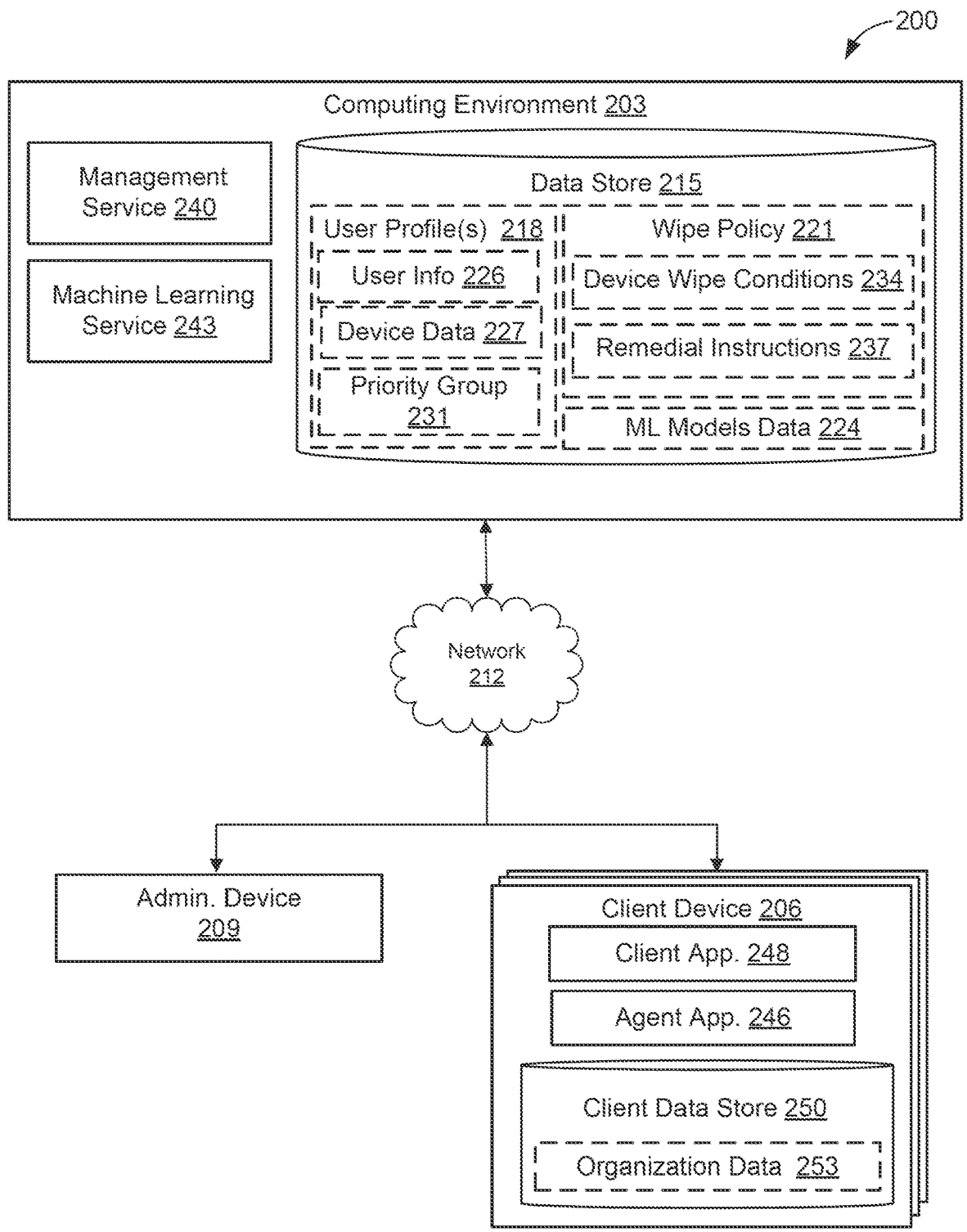
FIG. 2 is a drawing of a network environment according to various embodiments of the present disclosure.

With reference to FIG. 2, shown is a network environment 200 according to various embodiments. The network environment 200 can include a computing environment 203, a client device 206, and an admin device 209, which can be in data communication with each other via a network 212.

The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource, or any other distributed computing arrangement. In some cases, the computing environment 203 can correspond to an elastic computing resource where the allotted capacity of processing, network, storage, or other computing-related resources can vary over time.

Various data is stored in a data store 215 that is accessible to the computing environment 203. The data store 215 can be representative of a plurality of data stores 215, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 215 is associated with the operation of the various applications or functional entities described below. The data in the data store 215 can include user profiles 218, wipe policy 221, machine learning models data 224, and potentially other data.

The user profile 218 can represent an account or a profile for each user that has enrolled a client device 206 with a management service of the computing environment 203. Each user profile 218 can include user information 226, device data 227 and a priority group 231. The user information 226 can include data associated with a user, such as name, job title, job location, assigned organization group (e.g., marketing, engineering, executive), and other suitable user information. The device data 227 can include data associated with the client device 206 that is enrolled. For example, the device data 227 can include data associated with a device identifier, an installed operating system, a version of the operating system, installed applications, access permissions (e.g., related to restricted networked applications, restricted organization data), a list of hardware components for the client device 206, a device department group (e.g., marketing group, engineering testing group, executive officer status, etc.), a history of compliance checks performed (e.g., check-ins, compliance test performed on hardware and software components, a historical timestamp log for each compliance check), location device history, and other suitable device data. Some non-limiting examples of a device identifier can include a phone number, a device serial number, an International Mobile Equipment Identity (IME) number, a unique identifier for an operating system, and other suitable device identifiers.

The priority group 231 can represent a priority classification for the client device 206 of a particular user. For example, the priority classification can include an executive level, a managerial level, an individual contributor level, a high priority, a medium priority, a low priority, and other suitable priority classifications. In some examples, the priority classification can be assigned based on the job title or position of the particular user. For instance, the client devices 206 for an executive officer for the organization can be assigned an executive level classification.

The wipe policy 221 can represent a policy that includes instructions for handling a wipe workflow based on one or more detected wipe conditions. As such, the wipe policy 221 can be used to determine a wipe workflow, which can define the actions to be performed by the management service and/or the client device 206. In some examples, the wipe policy 221 can provide a series of steps for obtaining an approval or a rejection of the device wipe action during the time delay. The wipe policy 221 can include device wipe conditions 234, remedial instructions 237, whether a time delay is applied, the length of the time delay, whether a user appeal option is available, whether admin approval is required to permit a device wipe, and other suitable wipe policy data elements.

The device wipe conditions 234 can represent one or more device conditions that can trigger an immediate memory wipe. The device wipe conditions 234 can also trigger an analysis of whether a memory wipe should occur, which can involve an administrative user having an option to approve or reject the memory wipe. Some non-limiting examples of device wipe conditions 234 can include a compromised device (e.g., jailbreak/root detection—modification of software restrictions configured by a device manufacturer or by the organization), virus signature detection, device passcode compliance, inactive devices for a specified inactivity period, devices below a certain operating system/patch level, application incompliance, encryption incompliance, profile compliance, and other suitable conditions that can potentially lead to unauthorized access.

The remedial instructions 237 can represent one or more instructions to be performed in order to execute a remedial action. The remedial instructions 237 can be determined based on a selected wipe policy 221. In one non-limiting example, the remedial instructions 237 for a particular conditional wipe policy 221 can include locking the client device 206 from accessing certain applications and data, initiating a time delay for an analysis of the pending device wipe action (e.g., because of the device wipe conditions 234), and notifying an administrative user of the pending device wipe action. The notification can include a link to an administrative user interface for selecting whether a device wipe action should be approved or rejected. Further, in this particular conditional wipe policy 221, the remedial instructions 237 can include an optional user appeal interface that allows the user of the client device 206 to enter information, such as reasons for the administrative user to reject/terminate the device wipe. For example, the user may communicate that the device wipe conditions 234 were triggered unintentionally because of incompatible software installed on the device or other suitable reasons. The submitted user information can be reviewed by the administrative user and factored into their decision whether to permit the device wipe or terminate it.

The machine learning models data 224 can represent one or more machine learning models that have been trained, developed, evaluated, and deployed. The machine learning models can be used for determining which wipe policy 221 to select, for identifying device wipe conditions 234, and for other suitable purposes. For example, a machine learning model can be deployed to determine whether an immediate device wipe policy should be enforced or whether a conditional device wipe policy should be enforced. The machine learning model can be trained based on historical device wipe scenarios.

Various applications or other functionality can be executed in the computing environment 203. The components executed on the computing environment 203 include a management service 240, a machine learning service 243, and other applications, services, processes, systems, engines, or functionality not discussed in detail herein. The management service 240 can be executed to manage the operation of one or more managed client devices 206. The management service 240 can register or enroll individual client devices 206 to be managed according to the policies specified by an organization. Upon registration, the client device 206 can download and install an agent application associated with the management service 240.

In some examples, the management service 240 can transmit one or more wipe policies 221 to the client devices 206. The wipe policies 221 can provide device wipe conditions 234 and remedial instructions 237 related to device wipe scenarios. In other examples, the management service 240 can direct the client device 206 to perform certain actions because of a device wipe scenario.

The machine learning service 243 can be executed to train, test, evaluate, and deploy machine learning models for assisting in the enforcement of wipe device scenarios. The machine learning service 243 can be used to assist with selecting a wipe policy 221 based on a set of device wipe conditions 234. For example, the machine learning service 243 can use a machine learning model to determine whether an immediate device wipe or a conditional device wipe should be implemented based on a set of device wipe conditions 234. In some examples, the machine learning service 242 can identify historical wipe approvals and historical wipe rejections that can be used for further training of the machine learning models. For instance, if an administrator rejects or approves a particular device wipe scenario, the machine learning service 242 can be provided the action taken by the administrator, in which the action taken can be used for further training of the machine learning models (e.g., ML Models Data 224).

The client device 206 is representative of a plurality of client devices that can be coupled to the network 212. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 206 or can be connected to the client device 206 through a wired or wireless connection.

The client device 206 can be configured to execute various applications such as an agent application 246, a client application 248, or other applications. The agent application 246 can be executed in order to facilitate control of the operation of the client device 206 by the management service 240. The agent application 246 can receive instructions or commands from the management service 240. The agent application 246 can be downloaded and installed during an enrollment process with the management service 240. In some examples, the agent application 246 can implement a wipe policy 221 by identifying device wipe conditions 234, executing remedial instructions 237, and other aspects related to implementing a device wipe action.

The client application 248 can be executed in a client device 206 to access network content served up by the computing environment 203 or other servers, thereby rendering a user interface on the display. To this end, the client application 248 can include a browser, a dedicated application, or other executable applications, and the user interface can include a network page, an application screen, or other user mechanisms for obtaining user input. The client device 206 can be configured to execute applications beyond the client application 248, such as email applications, social networking applications, word processors, spreadsheets, or other applications.

Various data is stored in a client data store 250 that is accessible to the client device 206. The data stored in the client data store 250 is associated with the operation of the various applications or functional entities described in association with the client device 206. The data in the client data store 250 can include organization data 253 for a user of the client device 206. The organization data 253 can represent data associated with the organization and data that the organization desires to prevent unauthorized access. In some examples, a device wipe action can represent deleting the organization data 253 from the client data store 250. In other examples, a remedial action can represent an instruction to the agent application 246 for restricting access to the organization data 253 (e.g., for a lock device instruction that is implemented during a time delay).

The admin device 209 (herein after referred to as "the admin device 209") can be used to manage or control the client devices 206 enrolled with the management service 240. Additionally, the admin device 209 can render administrative user interfaces (see e.g., FIG. 3) that can be used to approve or reject pending/potential device wipe actions.

Next, a general description of the operation of the various components of the network environment 200 is provided. To begin, the agent application 246 can be installed on the client devices 206 of the users. At a subsequent point in time, the management service 240 can detect one or more device wipe conditions 234 associated with a particular client device 206. The detection of certain device wipe conditions 234 can trigger the management service 240 to determine whether to initiate a device wipe action remotely on the client device 206.

As a first non-limiting example, the device wipe condition 234 can be an indication that the client device 206 has been compromised (e.g., jailbreak/rooting). For instance, the client device 206 has been modified to remove software restrictions that have been configured by the device manufacturer or the organization associated with the management service 240. The management service 240 can identify a compromised incident as a device wipe condition 234. Based on the particular device wipe condition 234, the management service 240 can determine whether the applicable wipe policy 221 involves an immediate device wipe. Since the device wipe condition 234 has been specified as a severe condition, the management service 240 can immediately instruct the client device 206 to perform a device wipe action.

As a second non-limiting example, the device wipe condition 234 can be a failure of the client device 206 to check-in with the management service 240 in the last ninety days. Based on the detection of this particular device wipe condition 234 by the management service 240, the management service 240 can determine a wipe policy 221. In this second example, the management service 240 can select an applicable wipe policy 221 that is a conditional policy. As such, the management service 240 can initiate a timer that provides a time period for the administrative user to consider whether to approve or reject the pending device wipe action. In the event that a decision is not made by the expiration of the time period, the management service 240 can instruct the client device 206 to perform the device wipe action.

During the delay time period, the management service 240 can transmit a wipe notification to an admin device 209 for an administrative user. The notification can inform the administrative user of a pending wipe action. In some examples, the notification can include an indicator for the remaining time until the device wipe action will be performed without a decision from an administrative user.

The admin device 209 can display an administrative user interface (see e.g., FIG. 3). The administrative user interface can display data related to one or more pending device wipe actions. The administrative user can click on a user interface element for selecting an approval or a rejection of a pending wipe action. The management service 240 can identify trends and patterns associated with the pending device wipe action. These trends and patterns can be used by the administrator to determine whether to approve or reject a pending wipe action.

Referring next to FIG. 3, shown is an administrative user interface 300 displayed by an admin device 209. The administrative user interface 300 displays various aspects relating to pending/potential device wipes and previous executed device wipes. In some examples, the admin device 209 can receive a notification for a new pending wipe action or a reminder regarding currently pending wipe actions. Upon navigating to the administrative user interface 300, the administrative user interface 300 can display user interface elements 303 for approving or rejecting wipe actions. Additionally, the administrative user interface 300 can display a priority group indicator 309, a device identifier 312, a wipe policy indicator 315, a device assignment indicator 318, a time indicator 321, and other suitable user interface elements.

Figure 4A:
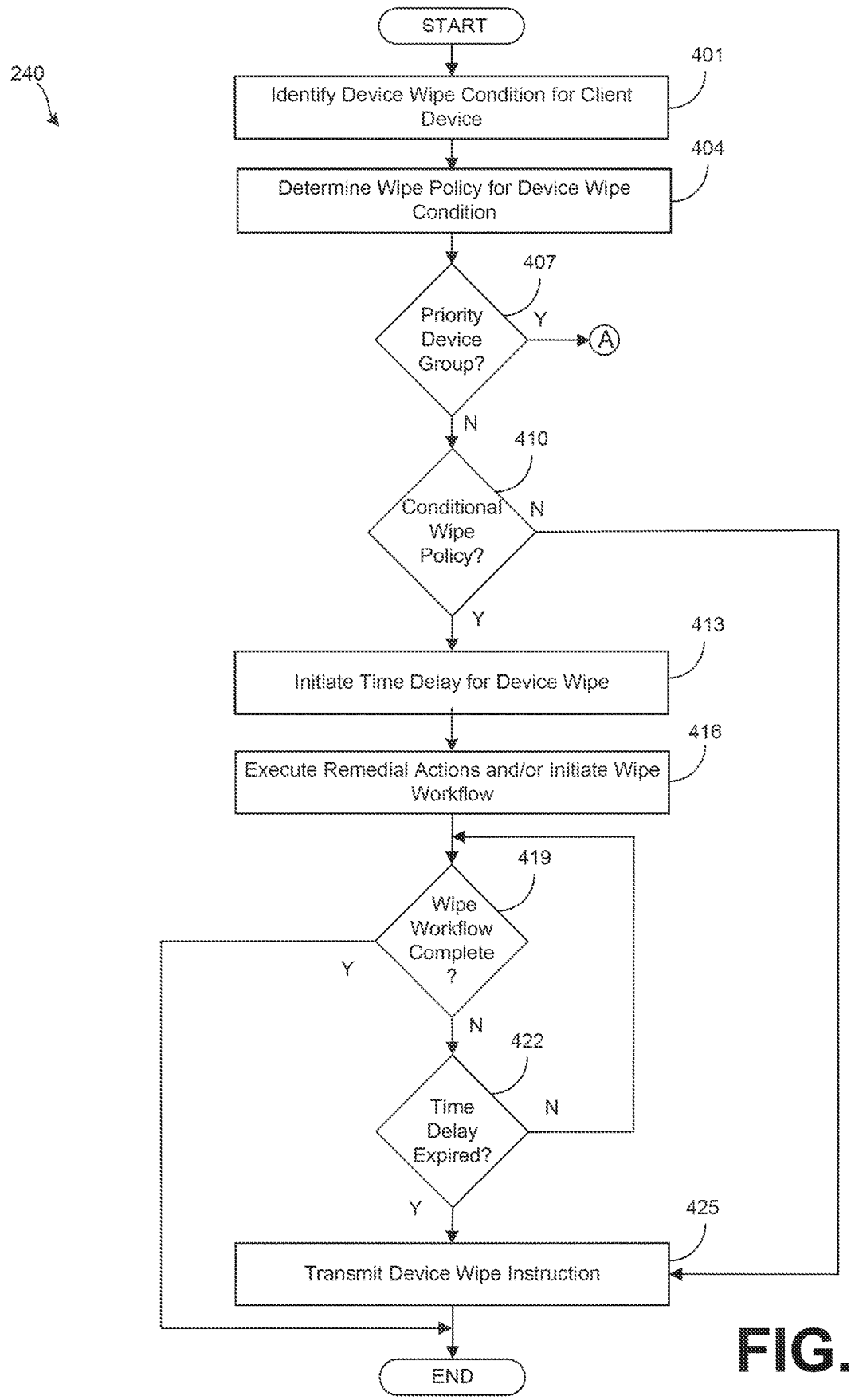
FIGS. 4A and 4B are flowcharts illustrating one example of functionality implemented as portions of an application executed in a computing environment in the network environment of FIG. 2 according to various embodiments of the present disclosure.

Referring next to FIG. 4A, shown is a flowchart that provides one example of the operation of a portion of the management service 240. The flowchart of FIG. 4A provides merely an example of the many different types of functional arrangements that can be employed to implement the operation of the depicted portion of the management service 240. As an alternative, the flowchart of FIG. 4A can be viewed as depicting an example of elements of a method implemented within the network environment 200.

Beginning with block 401, the management service 240 can identify one or more device wipe conditions 234 for a client device 206. In some instances, the agent application 246 can report the device wipe conditions 234 or the failure of the agent application 246 to report certain data that may result in a device wipe condition 234 (e.g., failure to check-in on a specific periodic time interval). Some non-limiting examples of device wipe conditions 234 can include a compromised device (e.g., jailbreak/root detection), virus signature detection, device passcode incompliance, inactive devices for a specified inactivity period, devices below a certain operating system/patch level, application incompliance, encryption incompliance, profile incompliance, and other suitable conditions that can potentially lead to unauthorized access.

In block 404, the management service 240 can determine a wipe policy 221 based on the device wipe conditions 234. Each wipe policy 221 can be assigned a set of device wipe conditions 234, which can be used to determine the wipe policy 221. For example, a critical wipe policy 221 can be associated with a first set of device wipe conditions 234, such as compromised devices (e.g., jailbreak/root detect), passcode incompliance, encryption incompliance, and other critical security device conditions. The determination of the wipe policy 221 can be used to determine remedial instructions (e.g., notifications, wipe workflows, a specified time delay period for a wipe workflow). For instance, if one of the first set of device wipe conditions 234 associated with the critical wipe policy 221 is detected, then the management service 240 can select the critical wipe policy 221.

Further, a conditional wipe policy 221 can be associated with a second set of device wipe conditions 234, such as an inactive device for a specified inactivity period, devices below a certain operating system/patch level, an application incompliance, profile incompliance, and other suitable security conditions. If one of the second set of device wipe conditions 234 associated with the conditional wipe policy 221 is detected, then the management service 240 can select the conditional wipe policy 221.

In some non-limiting examples, the management service 240 can use machine learning models data 224 to determine the wipe policy 221. For instance, a machine learning model that uses a classification algorithm can be used to classify or determine a wipe policy based at least in part on a set of device wipe conditions 234 and other data related to a context of a particular scenario.

In block 407, the management service 240 can determine whether the client device 206 is associated with a particular priority group 231. The priority group 231 can be determined from a user profile 218 associated with the client device 206. If the particular priority group 231 is identified as being associated with the client device 206, then the management service 240 can proceed to circle A (see e.g., FIG. 4B) to continue a progression for the priority group 231, in which the progression can include a workflow that is unique for the priority group 231. For example, a client device 206 that has a pending device wipe action can be identified as being associated with an executive priority group 231 for executive leaders within the organization. The management service 240 can proceed to circle A in order to execute a wipe workflow that is used for client devices 206 of executive leaders in the organization. If the client device is not associated with a particular priority group 231, then the management service 240 can proceed to block 410.

In block 410, the management service 240 can determine whether the wipe policy 221 is a conditional wipe policy 221. If the wipe policy 221 is not associated with a conditional wipe policy 221, then the management service 240 can proceed to block 425. If the wipe policy is considered a conditional wipe policy 221, then the management service 240 can proceed to block 413. For example, an organization may have three different wipe polices 221. Two of the wipe policies 221 may be classified as conditional wipe policies 221 because there is a time delay component for giving an administrative user the option to approve or reject a device wipe action. As such, the management service 240 can proceed to block 413 for client devices 206 that have been classified with either of these two wipe policies 221. The third wipe policy 221 can be associated with severe device wipe conditions 234 that do not need an administrative user to review. As such, the management service 240 can instruct an immediate device wipe action to the client device 206.

In block 413, the management service 240 can initiate a time delay for a device wipe action. In some non-limiting examples, the time delay can be determined based on the wipe policy 221. For example, a first wipe policy 221 can have a first time period for the time delay that is longer than a second time period specified for a second wipe policy 221. The first time period may be longer because the wipe policy 221 allows for user appeals. As a result, additional time may be needed for the user of the client device 206 to provide reasons to the administrative user for rejecting the device wipe action. The second time period may be shorter because the second wipe policy 221 may not permit user appeals. Thus, the wipe workflow does not need as much time. As such, the time delay can be specified and adjusted later by the administrative user.

In block 416, the management service 240 can execute a remedial action and/or initiate a wipe workflow. The determined wipe policy 221 can specify one or more remedial instructions 237 for the client device 206 and/or the management service 240. Some non-limiting examples of remedial instructions 237 can include transmitting a pending wipe notification to the admin device 209, locking the client device 206 from accessing particular restricted applications or restricted data, disabling access permissions associated with the client device 206, and other suitable remedial instructions. In some examples, the pending wipe notification can indicate that one or more client devices 206 have triggered a device wipe action and the administrative user has a time period to decide whether to permit the device wipe action. The pending wipe notification can include a link to an administrative user interface (see e.g., FIG. 3).

In some examples, the management service 240 can initiate a wipe workflow assigned to the wipe policy 221. A wipe workflow can include a series of steps for obtaining a wipe approval or a wipe rejection before the time delay expires. Some non-limiting examples of a wipe workflow can include a user appeal option and an admin approval workflow. For example, the user of the client device 206 can receive a notification of the pending device wipe. The user can enter reasons for rejecting the device wipe to the administrative user for consideration. After the reasons have been submitted, the administrative user can decide whether to approve or reject the device wipe action on the administrative user interface 300. In another example, the wipe workflow can be limited to the administrative workflow, in which the user appeal option is omitted.

Figure 5:
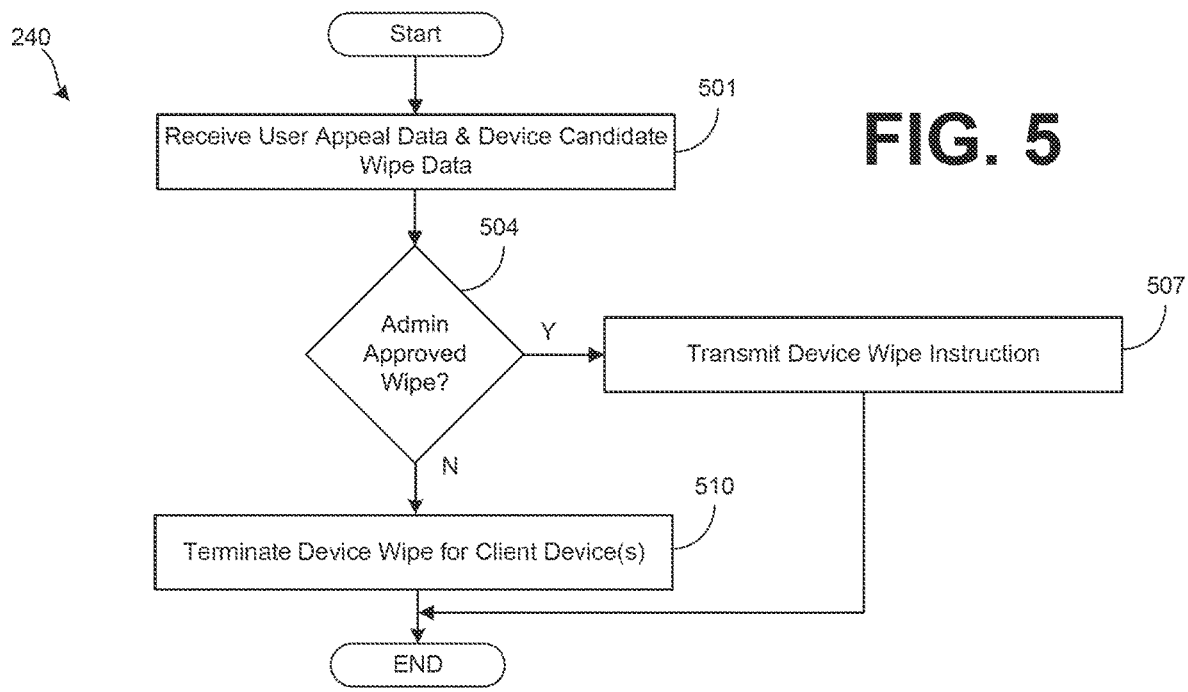
FIG. 5 is a flowchart illustrating one example of functionality implemented as portions of an application executed in a computing environment in the network environment of FIG. 2 according to various embodiments of the present disclosure.

In block 419, the management service 240 can determine whether the wipe workflow is complete. In some embodiments, a wipe workflow can be marked complete after receiving a decision from the administrative user interface 300 on whether to approve or reject a pending device wipe. The functionality for receiving a decision (e.g., an approval decision or an rejection decision) for the wipe workflow is shown in FIG. 5 as an example. If the wipe workflow is complete, then the management service 240 can proceed to the end. If the wipe workflow is not complete, then the management service 240 can proceed to block 422.

In block 422, the management service 240 determine whether the time delay period has expired. If the time delay period has not expired, then the management service 240 can proceed to block 419. If the time delay period has expired, then the management service 240 can proceed to block 425.

In block 425, the management service 240 can transmit device wipe instructions to one or more client devices 206. In some embodiments, the management service 240 can transmit the device wipe instruction to an agent application 246 installed on the client device. In some implementations, the device wipe instructions can include instructions to wipe (e.g., delete) the entire or certain portions of the client data store 250 (e.g., the memory). For instance, the device wipe instructions can indicate to delete the organization data 253 at certain memory locations. In another instance, the device wipe instructions can include instructions to delete portions of the client data store 250 and restore the client device 206 to a default state. The device wipe instructions can be determined and transmitted based on the wipe policy 221.

Figure 4B:
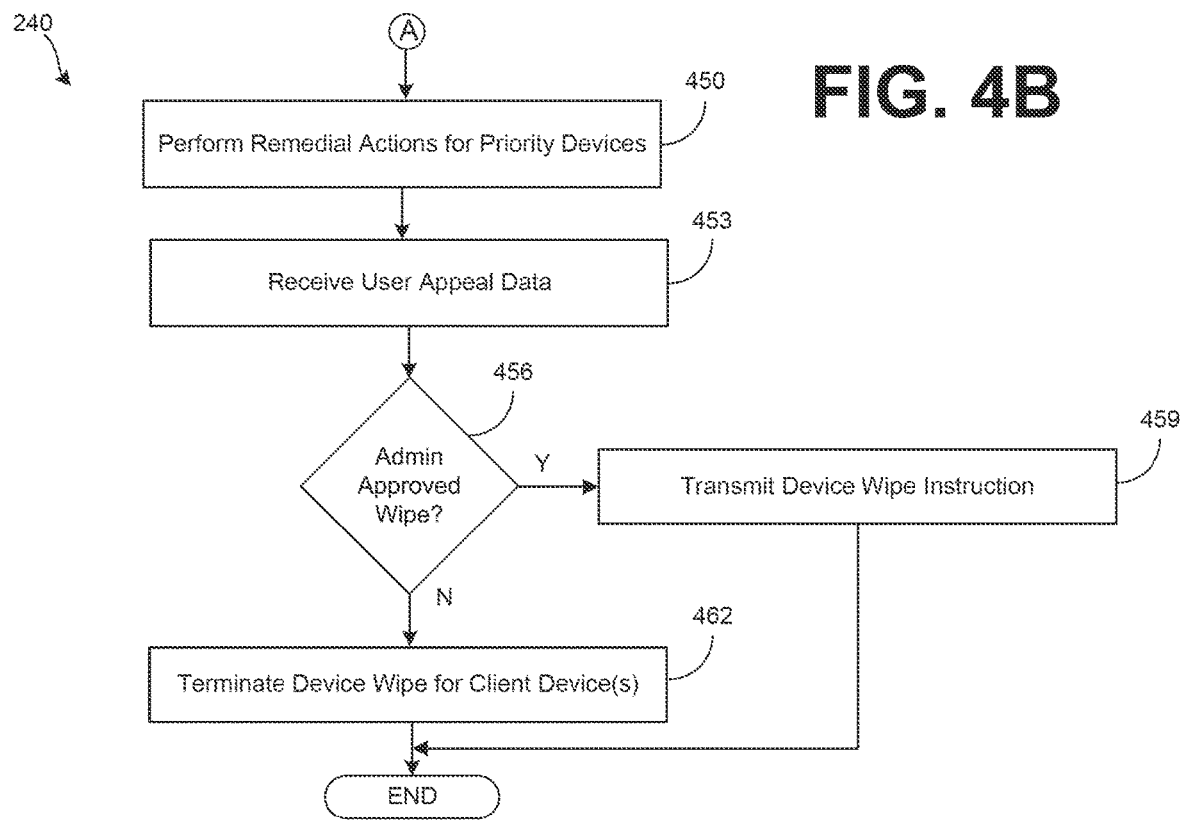

Turning now to FIG. 4B, shown is a flowchart that provides one example of the operation of a priority group workflow executed by the management service 240. The flowchart of FIG. 4B provides merely an example of the many different types of functional arrangements that can be employed to implement the operation of the depicted portion of the management service 240. As an alternative, the flowchart of FIG. 4B can be viewed as depicting an example of elements of a method implemented within the network environment 200.

To begin, FIG. 4B continues the flowchart from block 407 of FIG. 4A. The management service 240 proceeds to the blocks in FIG. 4B in instances in which a client device 206 has been identified as assigned to a priority group 231 in block 407 of FIG. 4A. A timer for a time delay can be omitted because the client device 206 is assigned to a priority group 231.

In block 450, the management service 240 can execute one or more remedial instructions 237 for the client device 206 assigned to a priority group 231. In some embodiments, the priority group 231 designation can override a wipe policy 221 associated with the detected device wipe conditions 234. For example, the detected device wipe conditions 234 may normally be associated with an immediate wipe policy 221. However, the management service 240 can execute a workflow for the priority group 231, which can require administrative approval before a device wipe is performed. Additionally, in some embodiments, the remedial instructions 237 can include transmitting a pending wipe notification to an administrative user. The pending wipe notification can indicate that the client device 206 is associated with the priority group 231. Some other non-limiting examples of remedial actions can include locking the client device 206 from accessing particular restricted applications or restricted data, disabling access permissions associated with the client device 206, and other suitable remedial instructions.

In block 453, the management service 240 can receive user appeal data from the user of the client device 206. The user of the client device 206 can receive a notification that their client device 206 has triggered a pending wipe action. The notification can include a link for the user to activate and submit reasons for the administrative user to reject the pending wipe action.

In block 456, the management service 240 can determine whether the administrative user has decided to approve or reject a pending wipe action. The management service 240 can display an administrative user interface for receiving a selection by the administrative user. If the administrative user approves the pending wipe action, then the management service 240 can proceed to block 459. If the administrative user rejects the pending wipe action, then the management service 240 can proceed to block 462.

In block 459, the management service 240 can transmit device wipe instructions to one or more client devices 206. In some embodiments, the management service 240 can transmit the device wipe instructions to an agent application 246 installed on the client device. In some implementations, the device wipe instructions can include instructions to wipe (e.g., delete) the entire or certain portions of the client data store 250 (e.g., the memory). For instance, the device wipe instructions can instruct the client device 206 to delete the organization data 253 at certain memory locations. In another instance, the device wipe instructions can include instructions to delete portions of the client data store 250 and restore the client device 206 to a default state. In some embodiments, the management service 240 can identify data associated with the wipe decision and use the data as training data for a machine learning model. Then, the management service 240 can proceed to the end.

In block 462, the management service 240 can indicate that the device wipe action has been rejected or terminated. In some embodiments, the management service 240 can identify data associated with the wipe decision and use the data as training data for a machine learning model. Then, the management service 240 can proceed to the end.

Turning now to FIG. 5, shown is a flowchart that provides one example of the operation of a portion of the management service 240. The flowchart of FIG. 5 provides merely an example of the many different types of functional arrangements that can be employed to implement the operation of the depicted portion of the management service 240. As an alternative, the flowchart of FIG. 5 can be viewed as depicting an example of elements of a method implemented within the network environment 200.

In block 501, the management service 240 can receive user appeal data from the user of the client device 206. The user of the client device 206 can receive a notification that their client device 206 has triggered a pending wipe action. The notification can include a link for the user to activate and submit reasons for the administrative user to reject the pending wipe action.

Additionally, the management service 240 can receive device candidate wipe data associated with a set of client devices 206 that are subject to the pending wipe action. For example, the management service 240 may have detected a large quantity (e.g., meeting a threshold quantity) of client devices 206 that have triggered a pending wipe action because of the same set of device wipe conditions 234. For example, an operating system update to a mobile device platform may have caused device wipe conditions 234 to trigger the pending wipe action. The device candidate wipe data can be used by the administrative user to identify patterns and/or trends associated with a pending wipe action.

In block 504, the management service 240 can determine whether the administrative user has decided to approve or reject a pending wipe action. The management service 240 can display an administrative user interface for receiving a selection by the administrative user. If the administrative user approves the pending wipe action, then the management service 240 can proceed to block 507. If the administrative user rejects the pending wipe action, then the management service 240 can proceed to block 510.

In block 507, the management service 240 can transmit device wipe instructions to one or more client devices 206. In some embodiments, the management service 240 can transmit the device wipe instructions to an agent application 246 installed on the client device. In some implementations, the device wipe instructions can include instructions to wipe (e.g., delete) the entire or certain portions of the client data store 250 (e.g., the memory). For instance, the device wipe instructions can indicate to delete the organization data 253 at certain memory locations. In another instance, the device wipe instructions can include instructions to delete portions of the client data store 250 and restore the client device 206 to a default state. In some embodiments, the management service 240 can identify data associated with the wipe decision and use the data as training data for a machine learning model. In some instances, the management service 240 can set a flag or indicator to communicate that the wipe workflow is complete. Then, the management service 240 can proceed to the end.

In block 510, the management service 240 can indicate that the device wipe action has been rejected or terminated. In some instances, the management service 240 can set a flag or indicator to communicate that the wipe workflow is complete. In some embodiments, the management service 240 can identify data associated with the wipe decision and use the data as training data for a machine learning model. Then, the management service 240 can proceed to the end.

Figure 6:
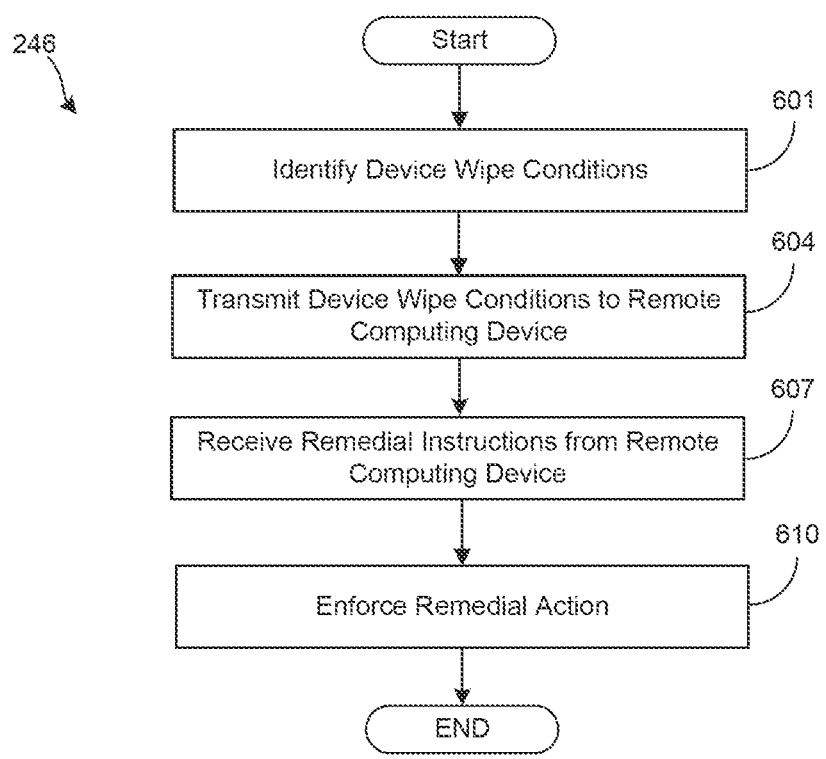
FIG. 6 is a flowchart illustrating one example of functionality implemented as portions of an application executed in a client device in the network environment of FIG. 2 according to various embodiments of the present disclosure.

Turning now to FIG. 6, shown is a flowchart that provides one example of the operation of a portion of the agent application 246. The flowchart of FIG. 6 provides merely an example of the many different types of functional arrangements that can be employed to implement the operation of the depicted portion of the agent application 246 of the client device 206. As an alternative, the flowchart of FIG. 6 can be viewed as depicting an example of elements of a method implemented within the network environment 200.

In block 601, the agent application 246 can identify a device wipe condition 234 on the client device 206. As a non-limiting example, the agent application 246 can detect a jailbreak/root detection incident, which involves a user modifying software restrictions configured by the manufacturer or the organization associated with the management service 240.

In block 604, the agent application 246 can transmit the device wipe conditions 234 to a remote computing device (e.g., the management service 240 within the computing environment 203). The remote computing device can determine a wipe policy 221 based on the device wipe conditions 234.

In block 607, the agent application 246 can receive the remedial instructions 237 from the remote computing device. The remedial instructions 237 can be determined from the wipe policy 221 identified from the device wipe conditions 234.

In block 610, the agent application 246 can enforce a remedial action on the client device 206 based on the remedial instructions 237. Then, the agent application 246 proceeds to the end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIGS. 4-6 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts of FIGS. 4-6 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
 a computing device comprising a processor and a memory; and
 machine-readable instructions stored in the memory that, when executed by the processor, cause the computing device to at least:
  identify a device wipe condition for a client device;
  determine a wipe policy associated with the device wipe condition;
  determine whether the wipe policy is an immediate device wipe policy or a conditional device wipe policy;
  in response to determining that the device wipe condition for the client device is met and the wipe policy is the immediate device wipe policy, transmit a wipe instruction to the client device to immediately execute a device wipe action;
  in response to determining that the device wipe condition for the client device is met and the wipe policy is the conditional wipe policy, transmit a pending wipe notification to an administrative device and initiate a time delay for the device wipe action for the client device based on the wipe policy, wherein the administrative device provides an option to reject the device wipe action before an expiration of the time delay; and
  transmit the wipe instruction to the client device to execute the device wipe action based on the expiration of the time delay for the device wipe action if the device wipe action was not rejected on the administrative device before the expiration of the time delay.

2. The system of claim 1, wherein the machine-readable instructions cause the computing device to at least:
 determine whether an administrative approval to wipe the client device has been provided in an instance in which the time delay for the device wipe action has been initiated.

3. The system of claim 1, wherein the device wipe condition comprises at least one of an inactive time period for the client device, an operating system version of the client device below a version threshold, and an incompliant application installed in the client device.

4. The system of claim 1, wherein the initiation of the time delay for the device wipe action further causes the computing device to at least:
 transmit a remedial instruction to the client device, wherein the remedial instruction restricts an operation of an operating system of the client device during the time delay.

5. The system of claim 4, wherein the remedial instruction is a locking instruction that locks a user from an operating system of the client device during the time delay.

6. The system of claim 1, wherein the wipe policy is further determined based on a machine learning model that has been trained with a plurality of previous administrator decisions for a plurality of previous device wipe actions.

7. A method, comprising:
 identifying, by a computing device, a device wipe condition for a client device;
 determining, by the computing device, a wipe policy associated with the device wipe condition;
 determining, by the computing device, whether the wipe policy is an immediate device wipe policy or a conditional device wipe policy;
 in response to determining that the device wipe condition for the client device is met and the wipe policy is the immediate device wipe policy, transmitting, by the computing device, a wipe instruction to the client device to immediately execute a device wipe action;
 in response to determining that the device wipe condition for the client device is met and the wipe policy is the conditional wipe policy, transmitting, by the computing device, a pending wipe notification to an administrative device and initiating, by the computing device, a time delay for the device wipe action for the client device based on the wipe policy, wherein the administrative device provides an option to reject the device wipe action before an expiration of the time delay; and
 transmitting, by the computing device, the wipe instruction to the client device to execute the device wipe action based on the expiration of the time delay for the device wipe action if the device wipe action was not rejected on the administrative device before the expiration of the time delay.

8. The method of claim 7, further comprising:
determining, by the computing device, whether an administrative approval to wipe the client device has been provided in an instance in which the time delay for the device wipe action has been initiated.

9. The method of claim 7, wherein the device wipe condition comprises at least one of an inactive time period for the client device, an operating system version of the client device below a version threshold, and an incompliant application installed in the client device.

10. The method of claim 7, wherein initiating the time delay for the device wipe action further comprises:
transmitting, by the computing device, a remedial instruction to the client device, wherein the remedial instruction restricts an operation of an operating system of the client device during the time delay.

11. The method of claim 10, wherein the remedial instruction is a locking instruction that locks a user from an operating system of the client device during the time delay.

12. The method of claim 7, wherein the wipe policy is further determined based on a device identifier associated with the client device, and the wipe instruction is further transmitted based on an administrative approval received from an administrative device.

13. A non-transitory, computer-readable medium, comprising machine-readable instructions that, when executed by a processor of a computing device, cause the computing device to at least:
identify a device wipe condition for a client device;
determine a wipe policy associated with the device wipe condition;
determine whether the wipe policy is an immediate device wipe policy or a conditional device wipe policy;
in response to determining that the device wipe condition for the client device is met and the wipe policy is the immediate device wipe policy, transmit a wipe instruction to the client device to immediately execute a device wipe action;
in response to determining that the device wipe condition for the client device is met and the wipe policy is the conditional wipe policy, transmit a pending wipe notification to an administrative device and initiate a time delay for the device wipe action for the client device based on the wipe policy, wherein the administrative device provides an option to reject the device wipe action before an expiration of the time delay; and
transmit the wipe instruction to the client device to execute the device wipe action based on the expiration of the time delay for the device wipe action if the device wipe action was not rejected on the administrative device before the expiration of the time delay.

14. The non-transitory, computer-readable medium of claim 13, wherein the machine-readable instructions further cause the computing device to at least:
determine whether an administrative approval to wipe the client device has been provided in an instance in which the time delay for the device wipe action has been initiated.

15. The non-transitory, computer-readable medium of claim 13, wherein the device wipe condition comprises at least one of an inactive time period for the client device, an operating system version of the client device below a version threshold, and an incompliant application installed in the client device.

16. The non-transitory, computer-readable medium of claim 15, the initiation of the time delay for the device wipe action further causes the computing device to at least:
transmit a remedial instruction to the client device, wherein the remedial instruction restricts an operation of an operating system of the client device during the time delay.

17. The non-transitory, computer-readable medium of claim 16, wherein the remedial instruction is a locking instruction that locks a user from an operating system of the client device during the time delay.

* * * * *